US009986236B1

(12) United States Patent
Mukherjee et al.

(10) Patent No.: US 9,986,236 B1
(45) Date of Patent: May 29, 2018

(54) METHOD AND APPARATUS FOR ENCODING A BLOCK USING A PARTITIONED BLOCK AND WEIGHTED PREDICTION VALUES

(71) Applicant: GOOGLE INC., Mountain View, CA (US)

(72) Inventors: Debargha Mukherjee, Cupertino, CA (US); Jim Bankoski, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 521 days.

(21) Appl. No.: 14/084,252

(22) Filed: Nov. 19, 2013

(51) Int. Cl.
*H04N 19/50* (2014.01)
*H04N 19/51* (2014.01)
*H04N 19/52* (2014.01)
*H04N 19/61* (2014.01)
*H04N 19/126* (2014.01)
*H04N 19/91* (2014.01)

(52) U.S. Cl.
CPC . *H04N 19/00696* (2013.01); *H04N 19/00951* (2013.01); *H04N 19/126* (2014.11); *H04N 19/50* (2014.11); *H04N 19/51* (2014.11); *H04N 19/52* (2014.11); *H04N 19/61* (2014.11)

(58) Field of Classification Search
None
See application file for complete search history.

(56) References Cited

U.S. PATENT DOCUMENTS

| 7,756,348 | B2 | 7/2010 | Mukherjee et al. |
| 2011/0135181 | A1* | 6/2011 | Yan ..................... G06T 7/0083 382/131 |
| 2012/0307910 | A1* | 12/2012 | Srinivasan ............. H04N 19/70 375/240.24 |
| 2013/0101039 | A1* | 4/2013 | Florencio ............. H04N 19/176 375/240.16 |
| 2013/0251039 | A1* | 9/2013 | Drugeon .......... H04N 19/00733 375/240.14 |

OTHER PUBLICATIONS

Wang et al., "Complexity Reduction and Performance Improvement for Geometry Partitioning in Video Coding". IEEE vol. 23, No. 2, Feb. 2013.*

(Continued)

*Primary Examiner* — William C Vaughn, Jr.
*Assistant Examiner* — Joseph A Towe
(74) *Attorney, Agent, or Firm* — Brake Hughes Bellermann LLP (57) ABSTRACT

An apparatus (e.g., a computer device) includes a video coding system. The video coding system includes an encoder. The encoder is configured to partition a block of video data into a first partition and a second partition, the first partition and the second partition being divided by a border that is at an angle to an orientation of a row or column of pixels, determine a first motion vector for the first partition and a second motion vector for the second partition, determine a first set of predictor values based on the first motion vector and a second set of predictor values based on the second motion vector, and combine the first set of predictor values and the second set of predictor values into an overall set of predictor values based on a weighting algorithm.

19 Claims, 8 Drawing Sheets

(56) References Cited

OTHER PUBLICATIONS

Zhang et al., "Motion Compensation using Polyline based Block Partition". IEEE Xplore 2009.*

Wang et al., "Complexity Reduction and Performance Improvement for Geometry Partitioning in Video Coding", IEEE vol. 23, No. 2, Feb. 2013.*

Zhang et al., "Motion Compensation using Polyline based Block Partition", IEEE Xplore 2009.*

Yuan et al., "Quadtree Based Nonsquare Block Structure for Inter Frame Coding in High Efficiency Video Coding", IEEE vol. 22, No. 12, Dec. 2012.*

Hung, et al, "On Macroblock Partition for Motion Compensation", 2006 IEEE International Conference on Image Processing, Oct. 2006, 4 pages.

Ferreira, et al, "Efficiency Improvements for a Geometric-Partition-Based Video Coder", 2009 16th IEEE International Conference on Image Processing (ICIP), Nov. 2009, 4 pages.

* cited by examiner

METHOD AND APPARATUS FOR ENCODING A BLOCK USING A PARTITIONED BLOCK AND WEIGHTED PREDICTION VALUES

BACKGROUND

Conventional video compression algorithms to significantly reduce the amount of data needed to transmit the video sequences with an acceptable level of quality. In conventional video coding standards the coding processes are performed using units of macroblocks of 16×16 pixels. In conventional motion compensation, each block or macroblock of size N×N is associated with a different motion vector and coding mode. Finally, residual error is coded using a transform, followed by quantization and entropy coding.

In early implementations of conventional decomposition, decomposition was restricted to macroblocks and sub-macroblocks of squares or rectangles. However, squares or rectangles macroblock shapes typically do not correspond to the outline of the shape of the moving object. In cases where a macroblock includes several regions with fixed shapes having different motion, the coding efficiency is substantially reduced. As a result, later implementations of decomposition introduced alternative macroblock shapes using oblique straight line partitions, followed by predicting the individual parts using separate motion vectors.

The later implementations typically use a prediction mechanism that selects between one motion vector and another, for every pixel, based on the underlying partition. However, this motion vector selection leads to an introduction of spurious high-frequencies in the corresponding predictor values (e.g., residual errors) that are detrimental to coding efficiency. In addition, a large number of possible partitions (e.g., resulting in a large number of possible motion vector combinations) are needed resulting in a large increase in utilization of computation resources.

As a result, there is a need for a technique for predictor value selection in implementations of quad-tree decomposition using macroblock shapes with oblique straight line partitions that minimize introduction of spurious high-frequencies and minimize utilization of computation resources.

SUMMARY

This disclosure relates to encoding video data. More specifically, this disclosure relates to generating predictor values (e.g., residual errors) for a block of video data.

One embodiment includes a method. The method includes partitioning a block of video data into a first partition and a second partition, the first partition and the second partition being divided by a border that is non-parallel and/or at a curved angle to an orientation of a row or column of pixels, determining a first motion vector for the first partition and a second motion vector for the second partition, determining a first set of predictor values based on the first motion vector and a second set of predictor values based on the second motion vector, and combining the first set of predictor values and the second set of predictor values into an overall set of predictor values based on a weighting algorithm.

Another embodiment includes an apparatus (e.g., a computer device) including a video coding system. The video coding system includes an encoder. The encoder is configured to partition a block of video data into a first partition and a second partition, the first partition and the second partition being divided by a border that is non-parallel and/or at a curved angle to an orientation of a row or column of pixels, determine a first motion vector for the first partition and a second motion vector for the second partition, determine a first set of predictor values based on the first motion vector and a second set of predictor values based on the second motion vector, and combine the first set of predictor values and the second set of predictor values into an overall set of predictor values based on a weighting algorithm.

Still another embodiment includes a method. The method includes partitioning a block of video data into a first block partition and a second block partition, determining a first motion vector for the first block partition and a second motion vector for the second block partition, determining a first set of predictor values based on the first motion vector and a second set of predictor values based on the second motion vector, and combining the first set of predictor values and the second set of predictor values into an overall set of predictor values based on a weighting algorithm.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

According to example embodiments, predictor selection for partitioned macroblocks (e.g., macroblocks partitioned into two block partitions) includes weighting two predictors (or predictor values or sets of predictor values) around a line (e.g., sinusoidal line and/or curved line) separating the partitions to determine a single predictor (or predictor values or sets of predictor values).

Figure 1:
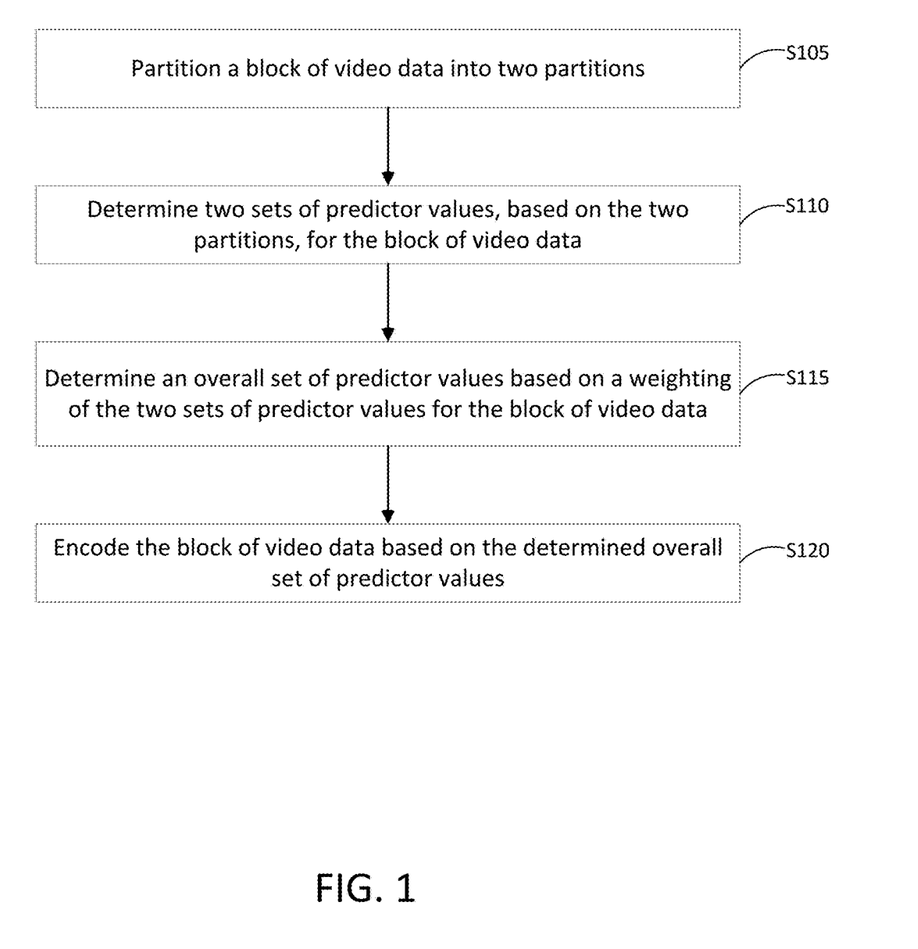
FIG. 1 illustrates a method according to at least one example embodiment.
Figure 4:
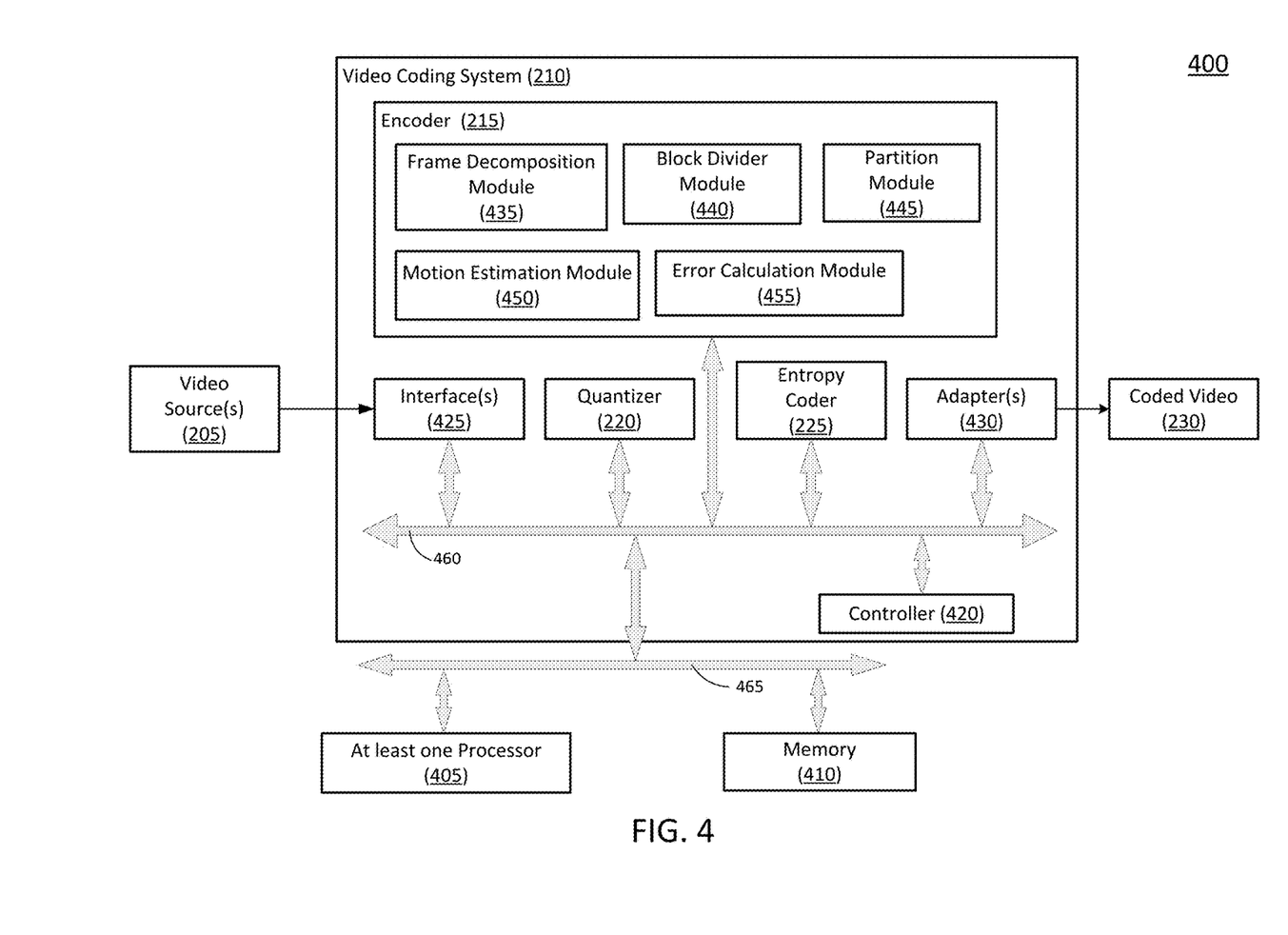
FIG. 4 illustrates a block diagram of a system according to at least one example embodiment.

FIG. 1 illustrates a method according to at least one example embodiment. The method steps described with regard to FIG. 1 may be executed as software code stored in a memory (e.g., memory 410 described below) associated with a system (e.g., as shown in FIG. 4) and executed by at least one processor (e.g., at least one processor 405 described below) associated with the system. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the video coding system 210 described below) and/or the system 400. Although the steps described below are described as being executed by a processor, the steps are not necessarily executed by a same processor. In other words, one or more processors may execute the steps described below with regard to FIG. 1.

As shown in FIG. 1, in step S105 a processor (e.g., at least one processor 405) partitions a block of video data into two block partitions. For example, a video frame may be decomposed into a plurality of N×N blocks (herein referred to as macroblocks or blocks) of video data. One or more of the blocks may be partitioned into two block partitions (e.g., first block partition 315-1 to 315-6 and/or second block partition 320-1 to 320-6 described below). Block partitions are not necessarily a size or specific shape. Accordingly, in step S105, partitioning a block of video data into two block partitions may include partitioning a block of video data into a first partition (e.g., a first block partition) and a second partition (e.g., a second block partition), the first partition and the second partition being divided by a border (e.g., border 310-1 or 310-2) that may be non-parallel and/or at a curved angle to an orientation of a row or column of pixels associated with the data block.

According to example embodiments, partitioning includes portioning a block of video data into two partitions based on a weighting scheme (which will be more apparent in the following description). The weights can change smoothly over each of the partitions, and the contribution from any one of the predictor values (described below) for any pixel may not become zero. In some example implementations of the weighting scheme the weights are obtained from a smooth ridge, whose orientation is along a sinusoidal or curved line. However, hereinafter the aforementioned partitions of a block of video data will be referred to as block partitions.

In step S110 the processor determines two sets of predictor values, based on the two block partitions, for the block of video data. For example, in video encoding, instead of directly encoding raw pixel values for each block, an encoder may find a block similar, using a block matching algorithm, to the block the encoder is encoding on a previously encoded frame, the similar block is referred to as a matching block or reference frame. If a matching block is found, the block may be encoded by a vector (e.g., a motion vector) and a prediction or residual error. The matching block may not be an exact match to the block the encoder is encoding. Therefore, the encoder may determine the differences (e.g., residual values) between the matching block and the block to be encoded. The residual values may be the prediction error or predictor value.

According to example embodiments, the two block partitions may have different (e.g., best matching) blocks for use as the matching frame from a previously encoded frame. Therefore, each of the two block partitions may have different motion vectors resulting in two sets of predictor values for the block of video data.

In step S115 the processor determines an overall set of predictor values based on a weighting of the two sets of predictor values for the block of video data. For example, a weight may be applied to each of the two predictor values for a pixel in the N×N block of video data. Each of the weights may be based on a position of the pixel in the N×N block of video data. The resultant values may be added together resulting in a single predictor value. Utilizing weighted predictor values may prevent the introduction of spurious high-frequencies and minimize utilization of computation resources.

In step S120 the processor encodes the block of video data based on the determined overall set of predictor values. For example, the overall set of predictor values (e.g., as the residual errors for a block) may be encoded using an appropriate transform, followed by quantization and entropy coding. The encoding based on the overall set of predictor values takes advantage of the two block partitions in that the encoded video data more closely corresponds to the outline of the shape of a moving object.

Figure 2:
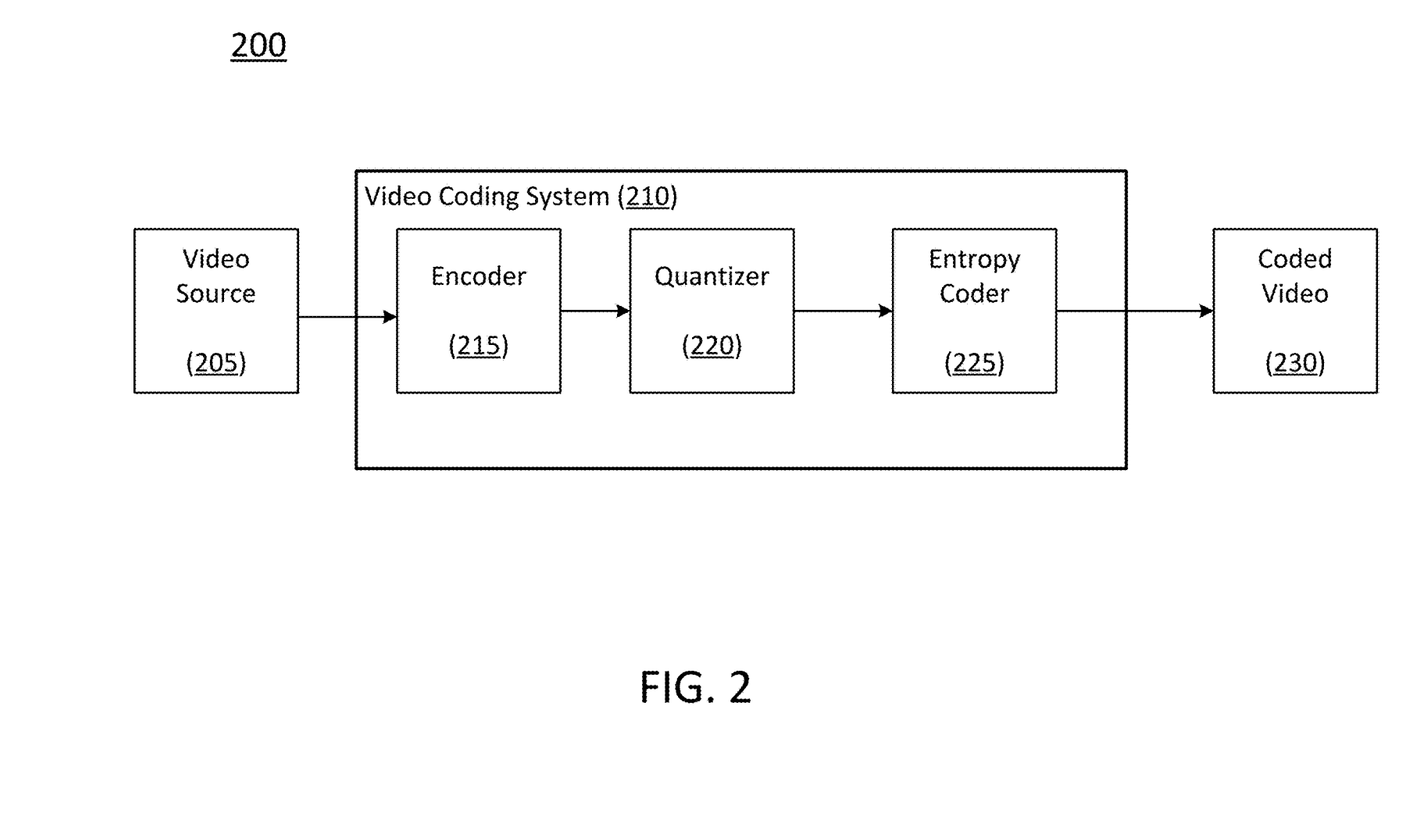
FIG. 2 illustrates a block diagram of a video coding system according to at least one example embodiment.

FIG. 2 illustrates a block diagram 200 of a video coding system 210 according to at least one example embodiment. As shown in FIG. 2, the block diagram 200 includes a video source 205, the video coding system 102, and a coded video block 230. The video coding system 210 includes an encoder 215, a quantizer 220, and an entropy coder 225. The video coding system 210 may include additional components not described and some of the components described modified and/or removed without departing from the scope of the example video coding system 210.

The video coding system 210 may receive a video content from a video source 205. The video source 205 may include any video source (e.g., a data storage device, a network, the Internet, a separate computing device, and the like). In addition, the video content may be analog or digital video. As described herein, the video coding system 210 may perform various coding functions on the video content received from the video source 205 to output a coded video 230. For example, the video coding system 210 may perform motion estimation or compensation operations on the video content. Motion estimation may refer to extracting the motion information from a video sequence. For example, at least one standard represents motion information by providing one or two motion vectors per macroblock, depending upon the type of motion compensation (e.g., forward predicted, backward predicted, or average). In addition, motion estimation may include processes for finding optimal or substantially optimal motion vectors for the macroblocks.

For example, the encoder 215 may estimate motion for macroblocks in a current frame based on similarly sized macroblocks in a previously sampled reference frame. The encoder 215 may decompose the video content into sequential frames while estimating the motion, and may further decompose the sequential frames into variously sized blocks including variously positioned block partitions, as described herein. The locations and sizes of the blocks and block partitions may be based on, for example, the edges of objects contained in the frames. In addition, the encoder 215 may determine (e.g., compute) and code motion vectors and prediction (e.g., residual) errors for the variously sized blocks and variously positioned block partitions.

The encoder 215 may compute the motion vectors, which identify the relationship between the present macroblock and the previous matched, macroblock. For example, a motion vector may identify position changes (of the pixels) between a first macroblock and a second macroblock. Motion vectors may be values which, when added to the coordinates of any pixel in the matching macroblock, provide the coordinates of the current macroblock. Because the motion estimation procedure provides vectors on a macroblock basis, all further calculations that would otherwise be performed on a pixel by pixel basis are performed on a macroblock basis. Accordingly, this motion estimation method requires less computational power than other pixel-wise approximation techniques.

Figure 3A:
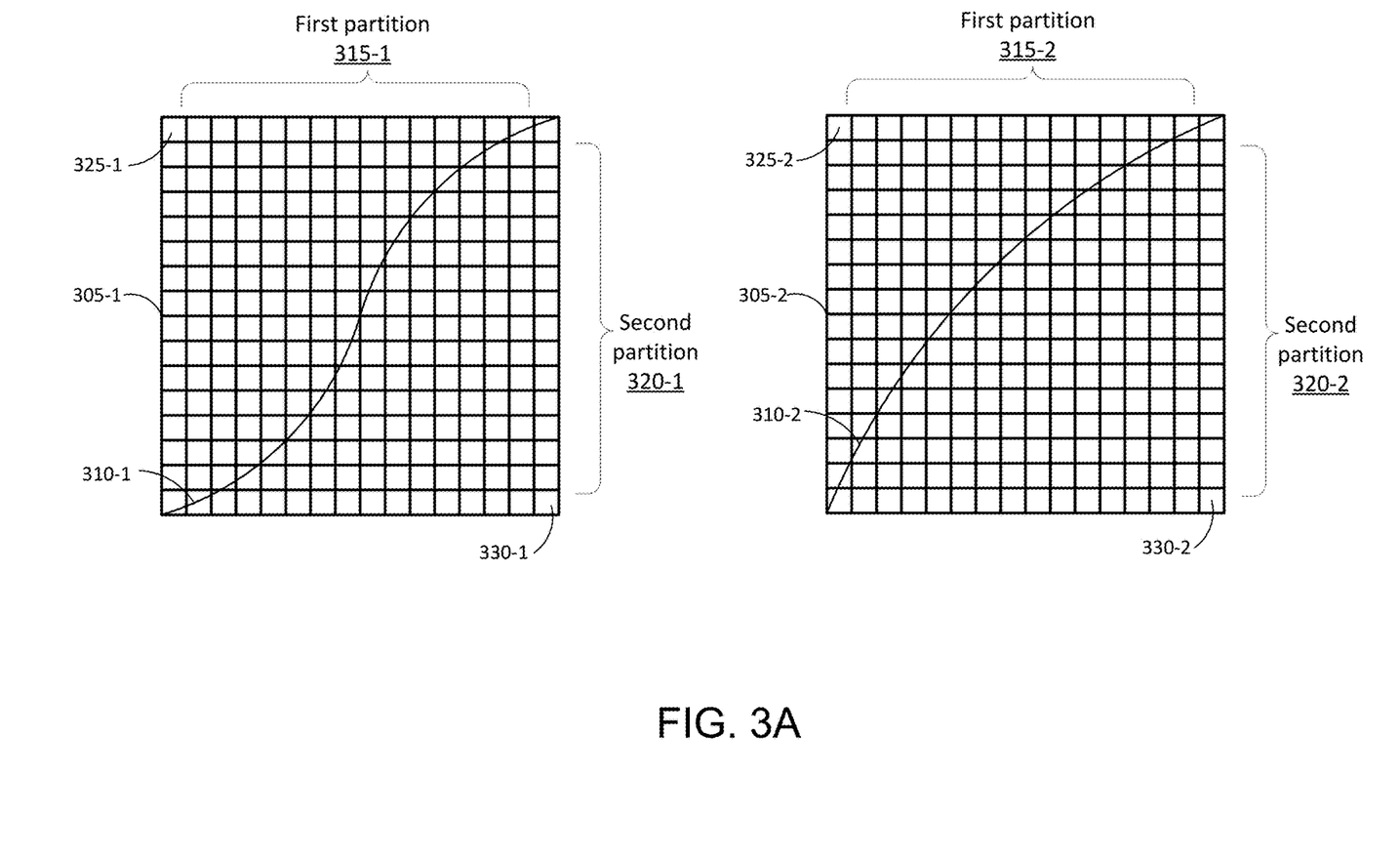
FIGS. 3A to 3C illustrate a block diagram of a partitioned video frame/block according to at least one example embodiment.
Figure 3B:
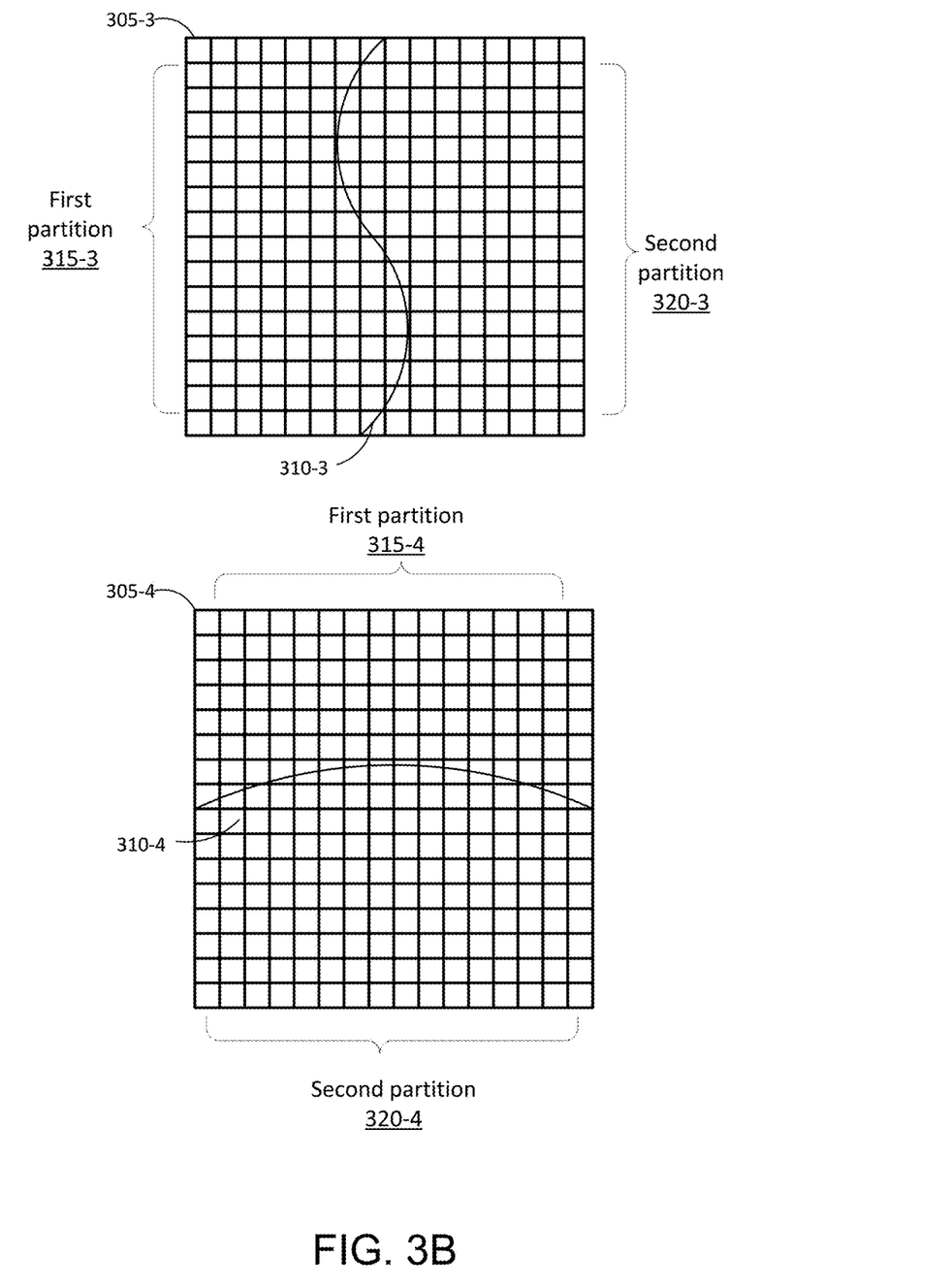
Figure 3C:
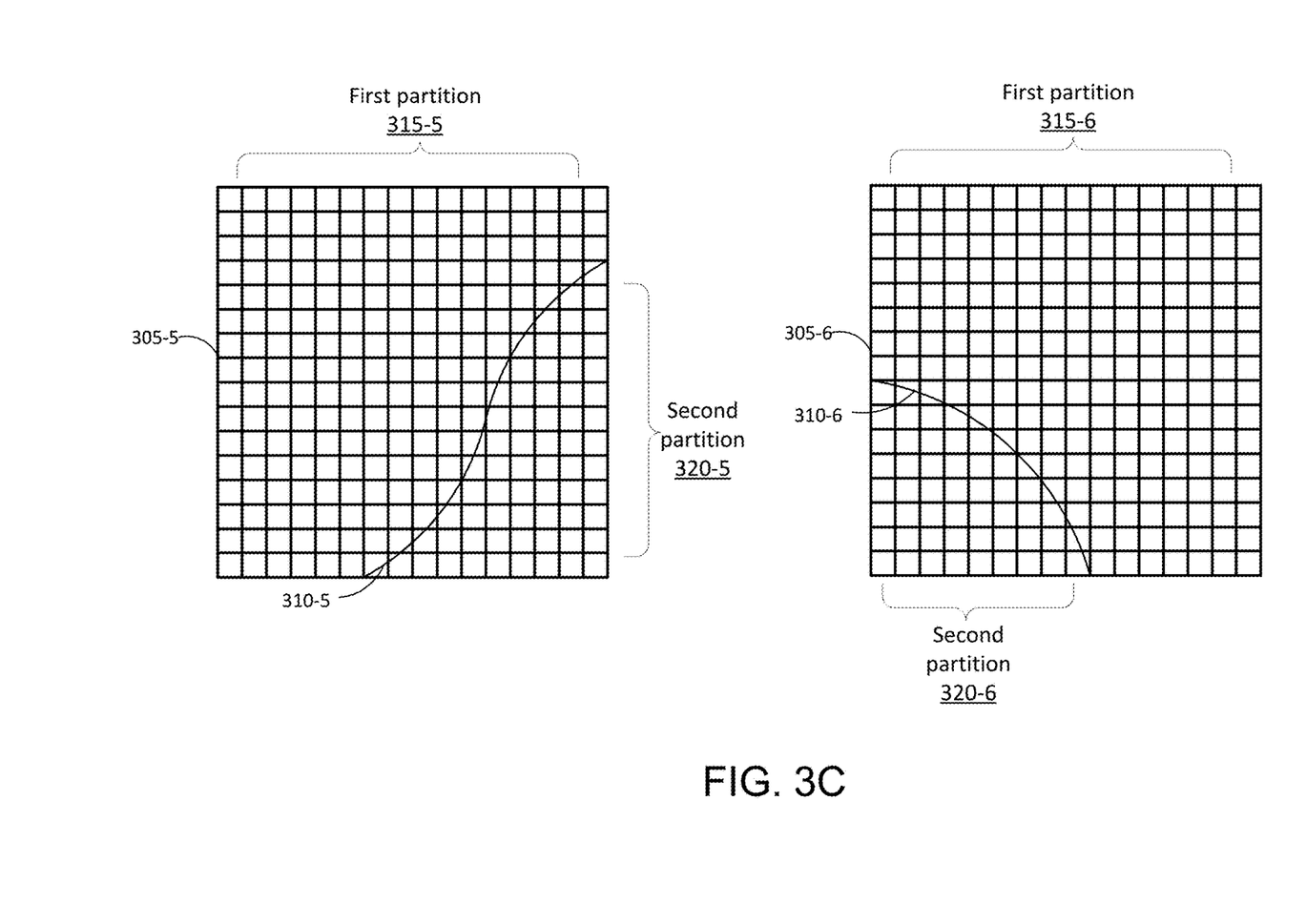

FIGS. 3A to 3C illustrate a block diagram of a partitioned video frame/block according to at least one example embodiment. Referring to FIG. 3A, the encoder 215 may decompose at least one of a plurality of frames into a plurality of macroblocks 305-1 to 305-6. The macroblocks 305-1 to 305-6 may include, for example, 16×16 pixels each (as shown). The macroblocks 305-1 to 305-6 may include, for example, 4×4, 4×8, 8×8, 8×16, 16×32, 32×32, and the like pixels each as well.

According to example embodiments, the macroblocks 305-1 to 305-6 may be further decomposed through use of block partitions 315-1 to 315-6 and 320-1 to 320-6, which form through insertion of a border 310-1 to 310-6 through a macroblock 305-1 to 305-6. Although the border 310-1 to 310-6 shown in FIGS. 3A to 3C are shown as a smooth line, example embodiments are not limited thereto. For example, border 310-1 to 310-6 may be a curved or sinusoidal stair step shaped line that follows along block boundaries.

The encoder 215 may position the border 310-1 to 310-6 such that the border 310-1 to 310-6 passes through any position in a macroblock 305-1 to 305-6. The encoder 215 may generate the set of block partitions 315-1 to 315-6 and 320-1 to 320-6 in an N×N macroblock 305-1 to 305-6 by sampling the space of along the border 310-1 to 310-6 at suitable intervals, yielding a dictionary of Nw entries. The dictionary of Nw entries may depend on design parameters, such as increment precision for the sampling.

The encoder 215 may split any of the N×N macroblocks 305-1 to 305-6 into block partitions 315-1 to 315-6 and 320-1 to 320-6. For example, as shown in FIG. 3A a 16×16 macroblock 305-1 may be split into two block partitions, first block partition 315-1 and second block partition 320-2, separated by border 310-1. Although border 310-1 is shown as a sinusoidal line, some example implementations may include a curved line or some combination thereof. For example, as shown in FIG. 3B, border 310-2 is a curved border. Accordingly, a first block partition 315-1 to 315-6 and second block partition 320-1 to 320-6 may take any shape shown in macroblocks 305-1 to 305-6, and/or some other shape. Pixels (or sub-blocks) 325-1, 325-2, 330-1 and 330-2 may be pixels with an extreme distal position (or furthest away from) the border 310-1 to 310-6.

As shown in FIGS. 3A and 3C, border 310-1, 310-2, 310-5 and 310-6 may be non-parallel and/or at a curved angle to an orientation of a row or column of pixels. However, as shown in FIG. 3B, the border 310-3, 310-4 may be somewhat parallel to an orientation of a row or column of pixels of macroblock 305-3, 305-4. As shown in FIGS. 3A and 3B, border 310-1 to 310-4 may divide the N×N blocks of macroblock 310-1 to 310-4, respectively, in half, substantially in half, and/or such that there is some symmetry between the two partitions. However, as shown in FIG. 3C, border 310-5 and 310-6 may divide the N×N blocks of macroblock 305-5 and 305-6, respectively, such that there is no symmetry between the two partitions.

The encoder 215 may furthermore perform motion estimation independently for each of the block partitions 315-1 to 315-6 and 320-1 to 320-6, thereby generating two motion vectors for each of the macroblocks 305-1 to 305-6 containing the block partitions 315-1 to 315-6 and 320-1 to 320-6. As such, each of the prediction (e.g., residual) errors associated with the motion vectors may be coded separately or they may be combined and coded as a single prediction (e.g., residual) error as described herein.

FIG. 4 illustrates a block diagram of a system according to at least one example embodiment. As shown in FIG. 4, system 400 may be at least one computing device and should be understood to represent virtually any computing device configured to perform the techniques and/or methods described herein. As such, the system 400 may be understood to include various standard components which may be utilized to implement the techniques and/or methods described herein, or different or future versions thereof. By way of example, the system 400 is illustrated as including at least one processor 405, as well as memory 410 (e.g., a computer readable storage medium and/or a non-transitory computer readable storage medium).

Thus, as may be appreciated, the at least one processor 405 may be utilized to execute instructions stored on the memory 410, so as to thereby implement the various features and functions described herein, or additional or alternative features and functions. Of course, the at least one processor 405 and the memory 410 may be utilized for various other purposes. In particular, it may be appreciated the memory 410 may be understood to represent an example of various types of memory and related hardware and software which might be used to implement any one of the modules described herein.

FIG. 4 illustrates the system according to at least one example embodiment. As shown in FIG. 4, the system 400 includes the at least one processor 405, the memory 410, the video source(s) 205, the video coding system 210, and the coded video block 230. The video coding system 210 includes a controller 420, interface(s) 425, adapter(s) 430, the quantizer 220, the entropy coder 225, and the encoder 215. The encoder 215 includes a frame decomposition module 435, a block divider module 440, a partition module 445, a motion estimation module 450, and an error calculation module 455. The at least one processor 405, the memory 410, and the video coding system 210 are communicatively coupled via bus 465. The controller 420, the interface(s) 425, the adapter(s) 430, the quantizer 220, the entropy coder 225, and the encoder 215 are communicatively coupled via bus 460.

The at least one processor 405 may be configured to execute computer instructions associated with the video coding system 210. The at least one processor 405 may be a shared resource. For example, the system 400 may be an element of a larger system (e.g., a mobile device, a personal computer or a server). Therefore, the at least one processor 405 may be configured to execute computer instructions associated with other elements (e.g., web browsing or wireless communication) within the larger system.

The memory 410 may be configured to store data and/or information associated with the system 400. For example, the memory 410 may be configured to store data tables including, for example, data tables related to codebooks for use by the video coding system 210 to encode video frames. For example, the memory 410 may be configured to store data tables including, for example, data tables storing weights for combining predictor values. The memory 410 may be a shared resource. For example, the system 400 may be an element of a larger system (e.g., mobile device). Therefore, the memory 410 may be configured to store data and/or information associated with other elements (e.g., web browsing or wireless communication) within the larger system.

The controller 420 may be configured to generate various control signals and communicate the control signals to various blocks in the video coding system 210. The controller 420 may include a microprocessor, a micro-controller, an application specific integrated circuit (ASIC), and the like. Data may be transmitted to various components of the video coding system 210 over the bus 460 that communicatively couples the various components of the video coding system 210. The bus 460 may be a memory bus, a memory controller, a peripheral bus, an accelerated graphics port, a processor bus using any of a variety of bus architectures, and the like.

The video source(s) 205, which may include the input device (not shown) may be configured to input images, frames of images, video frames, or representations of the video images (that is, the video images in code format, which may be referred to herein after as a "video image") to the video coding system 210. The video source(s) 205 may be connected to the controller 420 through an interface(s) 425 that is coupled to the bus 460. Alternatively, the video source(s) 205 may be coupled by other interfaces and/or bus structures, such as, parallel ports, USB ports, wireless ports, and/or the like.

As shown in FIG. 4, the encoder 215 includes the frame decomposition module 435, the block divider module 440, the partition module 445, the motion estimation module 450, and the error calculation module 455. The elements 435-455 contained in the encoder 215 may include software modules, hardware components, or combinations thereof. The controller 420 may instruct (or invoke) the elements 435-455 to decompose video sequence frames and to estimate motion in the video sequence frames.

For example, the controller 420 may instruct the encoder 215 to decompose each of the video sequence frames into macroblocks 305-1 to 305-6 having a first set of dimensions N×N. Accordingly, the frame decomposition module 435 may be configured to decompose (e.g., based on a quad-tree decomposition) the video sequence frames. For example, the controller 420 may instruct the encoder 215 (to use the block divider module 440) to divide the video sequence frames into macroblocks 305-1 to 305-6. In addition, the N×N macroblocks 305-1 to 305-6 may be divided (and/or repeatedly divided) to have N/2×N/2 dimensions.

For example, the controller 420 may instruct the encoder 215 to partition those macroblocks 305-1 to 305-6 into two block partitions (e.g., first block partition 315-1 to 315-6 and second block partition 320-1 to 320-6). Accordingly, the partition module 445 may find the best border 310-1 to 310-6 from a codebook of limited splices (e.g., stored in memory 410), to split the macroblock 305-1 to 305-6 into the two block partitions. In one example, in determining how to partition the macroblocks 305-1 to 305-6 into the block partitions, the partition module 445 may evaluate all possible block partition combinations to determine which combination yields substantially optimized rate-distortion efficiency. Alternatively, or in addition to, evaluating possible block partition combinations may be based on whether or not a frame has moving objects and/or a uncovered background (e.g., a relatively high prediction error along a band of video including the border 310-1 and/or 310-2).

In addition, the controller 420 may instruct the quantizer 220 to quantize the coded parts of the video sequence frames and the entropy coder 225 to entropy code the coded video sequence frames. The controller 420 may, moreover, transmit or otherwise send the coded video 230 outside of the video coding system 210 through one or more adapters 430. For example, the coded video 230 may be sent over a network, such as, an internal network, an external network (the Internet), etc., to a another computing device. For example, the coded video 230 may also be outputted to one or more output devices, such as, displays, printers, facsimile machines, etc.

Accordingly, the controller 420 may be connected to memory 410 through the buses 460 and 465. The memory 410 may be configured to provide storage of software, algorithms, and the like, that provide the functionality of the video coding system 210. By way of example, the memory 410 may store an operating system, application programs, program data, and the like. In this regard, the memory 410 may be implemented as a combination of one or more of volatile and non-volatile memory, such as DRAM, EEPROM, MRAM, flash memory, and the like. In addition, or alternatively, the memory 410 may include a device configured to read from and write to a removable media, such as, a floppy disk, a CD-ROM, a DVD-ROM, or other optical or magnetic media.

Further, the controller 420 may be connected to the encoder 215, the quantizer 220, and the entropy coder 225 through the bus 460. In one example, the encoder 215, the quantizer 220, and the entropy coder 225 may include hardware composed of one or more hardware components. In addition, or alternatively, the encoder 215, the quantizer 220 and the entropy coder 225 may include software stored, for example, in the memory 410. In any regard, the controller 420 may be configured to instruct the encoder 215, the quantizer 220, and the entropy coder 225 to code the video content received from the video source(s) 205. Although the controller 420 has been depicted and described as forming a component separate from the encoder 215, the controller 420 may form part of the encoder 215, in which the encoder 215 would include the controller 420 and its functions described herein, without departing from a scope of the encoder 215.

Figure 5:
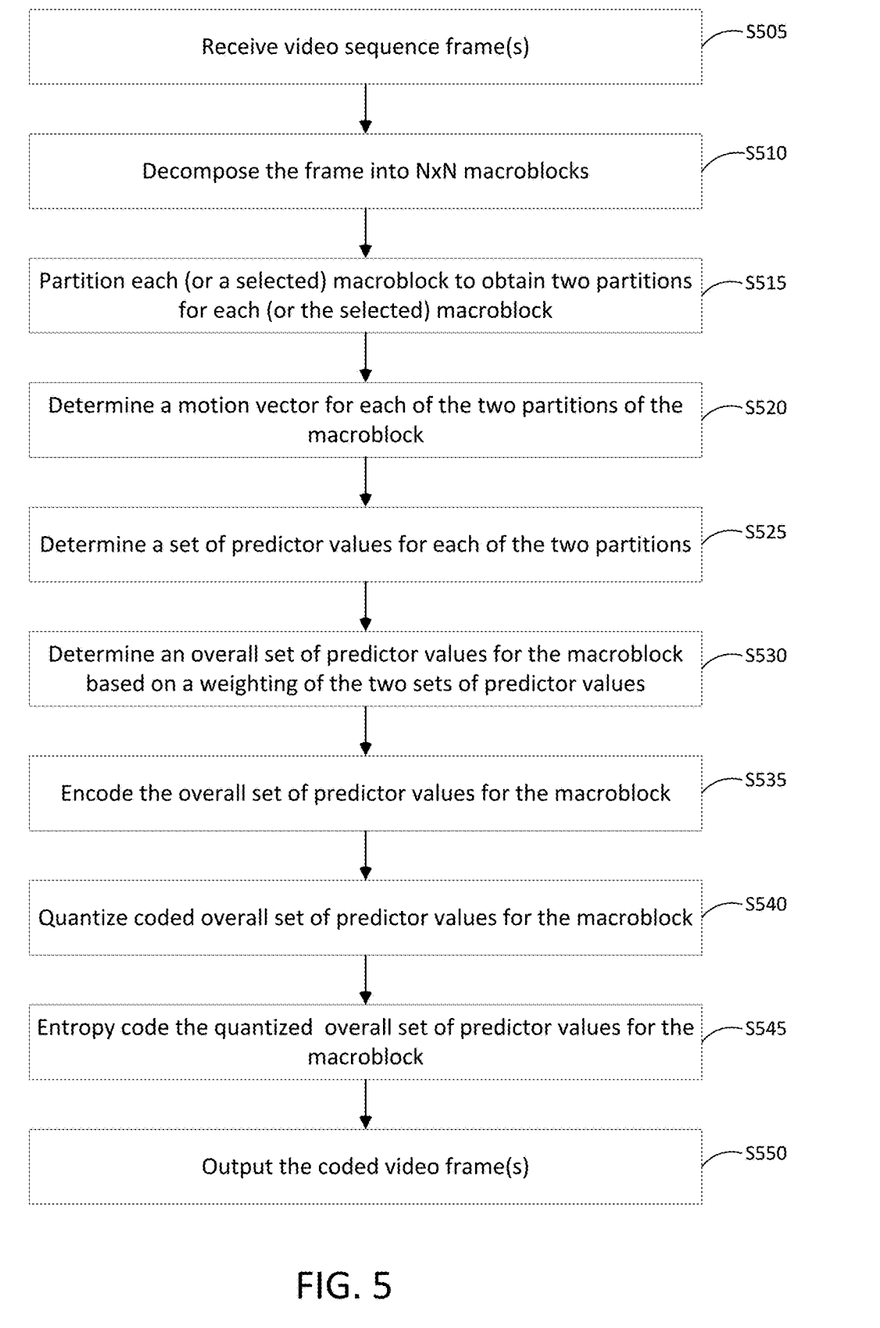
FIG. 5 illustrates a method according to at least one example embodiment.

FIG. 5 illustrates a method according to at least one example embodiment. The method steps described with regard to FIG. 5 may be executed as software code stored in a memory (e.g., memory 410) associated with a system (e.g., as shown in FIG. 4) and executed by at least one processor (e.g., at least one processor 405) associated with the system. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the video coding system 210) and/or the system 400. Although the steps described below are described as being executed by a processor, the steps are not necessarily executed by a same processor. In other words, at least one processor may execute the steps described below with regard to FIG. 5.

As shown in FIG. 5, in step S505 a processor (e.g., at least one processor 405) receives video sequence frame(s). For example, the controller 420 may instruct the encoder 215 to receive one or more frames from the video source(s) 205. The video sequence frame(s) the may include any video source (e.g., a data storage device, a network, the Internet, a separate computing device, and the like). For example, video sequence frame(s) may be video frames associated with a video stream. The video stream may be a real time video stream (e.g., a video conference or a video chat). For example, the video stream may be a previously recorded video (e.g., a movie or a video recorder recording). In addition, the video content may be analog or digital video.

In step S510 the processor decomposes the frame into N×N macroblocks. For example, the controller 420 may instruct the encoder 215 to use the frame decomposition module 435 to decompose each of the video sequence frames into macroblocks 305-1 to 305-6 having N×N dimensions. The frame decomposition module 435 may, for example, utilize a quadtree decomposition technique to decompose the video sequence frames as depicted in FIG. 3A and/or FIG. 3B.

In step S515 the processor partitions each, or alternatively a selected, macroblock to obtain two block partitions for each (or the selected) macroblock. For example, the controller 420 may instruct the encoder 215 to use the partition module 445 to partition those macroblocks 305-1 to 305-6 into two block partitions (e.g., first block partition 315-1 to 315-6 and second block partition 320-1 to 320-6). The block partition partition module 445 may find the best border 310-1 to 310-6 from a codebook of limited borders (e.g., stored in memory 410), to split the macroblock 305-1 to 305-6 into the two block partitions. In one example, in determining how to partition the macroblocks 305-1 to 305-6 into the block partitions, the partition module 445 may evaluate all possible block partition combinations to determine which combination yields substantially optimized rate-distortion efficiency. Alternatively, or in addition to, evaluating possible block partition combinations may be based on whether or not a frame has moving objects and/or an uncovered background (e.g., a relatively high prediction error along a band of video including the border 310-1 to 310-6).

In some implementations, the encoder may seek the best encoding strategy by alternating between motion search and partition search. For a given pair of reference frames A and B to be used for combing the predictors, the encoder may first find the best motion vectors from each of the reference frames by doing a search over all the pixels in the macroblock. Thereafter, while keeping the motion vectors fixed, the encoder may search the best partition by searching over all the available weighting schemes. Once the best partition (weighting scheme) is obtained, the encoder may re-compute the best motion, from reference frames A and B, but this time only considering the pixels in the macroblock that come predominantly from the respective reference for the given partition. Whether a pixel comes predominantly from one reference or not may be obtained by a hard thresholding of the weight value for that pixel.

In step S520 the processor determines a motion vector for each of the two block partitions of the macroblock. For example, the controller 420 may instruct the encoder 215 to use the motion estimation module 450, to estimate motion in the video content from macroblocks in a current frame, sampled at a first time, with similarly sized macroblocks in a reference frame, sampled at a second time. The second sample time may be prior to the sample time of the current frame. The locations and sizes of the blocks and block partitions may be based, for example, upon the edges of objects contained in the frames. The encoder 215 may compute and code motion vectors for the variously sized blocks and variously positioned block partitions.

The encoder 215 may compute the motion vectors, which identify the relationship between the present macroblock and the previous, matched, macroblock. For example, a motion vector may identify the change in position of the pixels between a first macroblock and a second macroblock with respect to each of the two block partitions. Each block partition of the first macroblock and the second macroblock may be separately compared, or alternatively, the first macroblock and the second macroblock may be compared first, followed by a block partition comparison. Further, each of the block partitions may be associated with a different motion vector and coding mode (e.g., inter-prediction or intra-prediction as well as forward prediction and backward prediction).

For example, the controller 420 may instruct the encoder 215 to determine the best set of predictor values for the block partitions (e.g., first block partition 315-1 to 315-6 and/or second block partition 320-1 to 320-6). More particularly, for example, the motion estimation 450 may employ an inter-predictor to determine motion vectors for each of the first block partition 315-1 to 315-6 and second block partition 320-1 to 320-6 based upon a reference frame. In addition, or alternatively, the motion estimation 450 may employ an intra-predictor to also determine motion vectors based upon selected pixels in neighboring blocks. The motion estimation 450 may employ an inter-predictor to determine motion vectors for each of the first block partition 315-1 to 315-6 and/or second block partition 320-1 to 320-6 and the controller 420 may determine a best combination of block partitions based on residual errors for the plurality of motion vectors.

In step S525 the processor determines a set of predictor values for each of the two block partitions. For example, the controller 420 may instruct the encoder 215 to use the error calculation module 455, to calculate residual errors for the motion vectors predicted by both the inter-predictor and the intra-predictor and may determine which of the motion vectors has the lowest residual error. Accordingly, the best block partitions fir the first block partition 315-1 to 315-6 and/or second block partition 320-1 to 320-6 may include the combination of block partitions that yields the lowest residual error. Alternatively, and/or in addition to, the best block partitions for the first block partition 315-1 to 315-6 and/or second block partition 320-1 to 320-6 may include the combination of block partitions first block partition 315-1 to 315-6 and second block partition 320-1 to 320-6 that yields substantially optimized rate-distortion efficiency. The controller 420 may select the lowest residual error for each of the best block partitions as the set of predictor values for each of the two block partitions (and the corresponding motion vectors) for encoding.

In step S530 the processor determines an overall set of predictor values for the macroblock based on a weighting of the two sets of predictor values. In other words, the residual errors associated with the best block partitions for a single block 305-1 to 305-6 may be combined into a single square block (e.g., 16×16 block) based on a weighting algorithm. For example, the controller 420 may read a weighting mask from a mask codebook (e.g., stored in memory 410) based on a pixel index in the block. Each entry in the mask codebook may provide a weight that indicates whether only one predictor is used or the other, or a weighted combination of the two. For example, a weight value of zero (0, 1) may indicate a first value is not used (e.g., scaled to zero) and a second is to be used (e.g., scaled by one). The following algorithms exemplify weighting of predictor values for a pixel index i, j.

In this example, the weight is a number between 0 and 64 (however, other ranges are within the scope of this disclosure). If P1 and P2 indicate two predictor values (e.g., residual error values) obtained from the two motion vectors, and m is the read weighting mask value, then the overall (or combined) predictor value obtained for each pixel [i, j] in the block may be given by:

$$P[i,j]=P1[i,j]*W[m,i,j]+P2[i,j]*(64-W[m,i,j]) \quad (1)$$

Where the function W[m, i, j] can be represented by, for example, a function stored in relation to the table storing the possible weighting mask value. For example, multiple mask codebooks may be stored based on the dimension (e.g., N×N) of the block. Therefore, the controller 420 may select a function W[m, i, j], mask codebook combination for determining the overall set of predictor values for the macroblock. The function W[m, i, j], mask codebook combination may be preselected as part of an installation of the system 400. The function W[m, i, j], mask codebook combination may vary based on prediction type (e.g., inter-prediction or intra-prediction). The function W[m, i, j], mask codebook combination may vary based on transmission parameters (e.g., transmission rate).

Alternatively, or in addition to, the function W[m, i, j] can be represented by, for example, a polynomial function in i and j poly_m( ) for each m, followed by applying a smoothing function smoother( ). For example, the function W[m, i, j] may be given by:

$$W[m,i,j]=\text{smoother}(\text{poly}\_m(i,j)) \quad (2)$$

Where poly_m can be represented by a set of coefficients for each m. For example, the function poly_m( ) may be given by:

$$\text{poly}\_m(i,j)=A*(i-i0)+B*(j-j0) \quad (3)$$

$$\text{poly}\_m(i,j)=A*(i-i0)+B*(j-j0)+C*(i-i0)*(j-j0) \quad (4)$$

$$\text{smoother}(x)=(1+\tan h(x/k))*32 \quad (5)$$

Where A, B, i0 and j0 are provided in a table (e.g., a table corresponding or related to the mask codebook) for each m, and k is a constant. Further, poly_m( ) in equation (3) is linear and poly_m( ) in equation (4) is non-linear, and the boundary is a curved line. Equations (3) and (4) may be alternative techniques for determining poly_m( ) according to example embodiments. Further, smoother (equation (5)) may ensure that the weights become, for example, 0 and 64 farther (e.g., at pixels represented by blocks 325 and 330) away from the boundary of the polynomial, and transitions smoothly closer to the boundary. An integer implementation of the smoother is illustrated in a code listing as follows:

```
static int_get_snmooth weight(int m) {
#define SMOOTHER_LEN 16
  static const uint8_t smoothfn[2*SMOOTHER_LEN+
    1]={
    1, 1, 1, 1, 2, 2, 3, 4, 5, 7, 9, 12, 15, 19, 23, 27,
    32, 37, 41, 45, 49, 52, 55, 57, 59, 60, 61, 62, 62, 63,
      63, 63, 63,
  };
  if (m<-SMOOTHER_LEN)
    return 0;
  else if (m>SMOOTHER_LEN)
    return (1<<MASK_WEIGHT_BITS);
  else
    return smoothfn[m+SMOOTHER_LEN];
}
```

In step S535 the processor encodes the overall set of predictor values for the macroblock. For example, the controller 420 may instruct the encoder 112 to code the motion vectors 132 and the prediction values (e.g., residual errors). The motion vectors for the macroblocks 305-1 to 305-6 and the block partitions 315-1 to 315-6 and/or 320-1 to 320-6 may be coded through use of an appropriate transform. For example, the residual errors for the macroblocks 305-1 to 305-6 may be coded through computation of a square block transform yielding transform coefficients.

In step S540 the processor quantizes the coded overall set of predictor values for the macroblock. For example, the controller 420 may instruct (or invoke) the quantizer 220 to quantize the coded motion vectors and the coded residual errors, through any reasonably suitable quantization techniques. In addition, at step S545, the controller 420 may instruct the entropy coder 225 to, for example, assign codes to the quantized motion vector codes and residual error codes to match code lengths with the probabilities of the quantized motion vector codes and residual error codes, through any coding technique.

In step S550 the processor outputs the coded video frame(s). For example, the controller 420 may output the coded video 230 (e.g., as coded video frames) to one or more output devices. The controller 420 may output the coded video as a single motion vector and a single set of predictor values (e.g., residual errors) for the macroblock.

Figure 6:
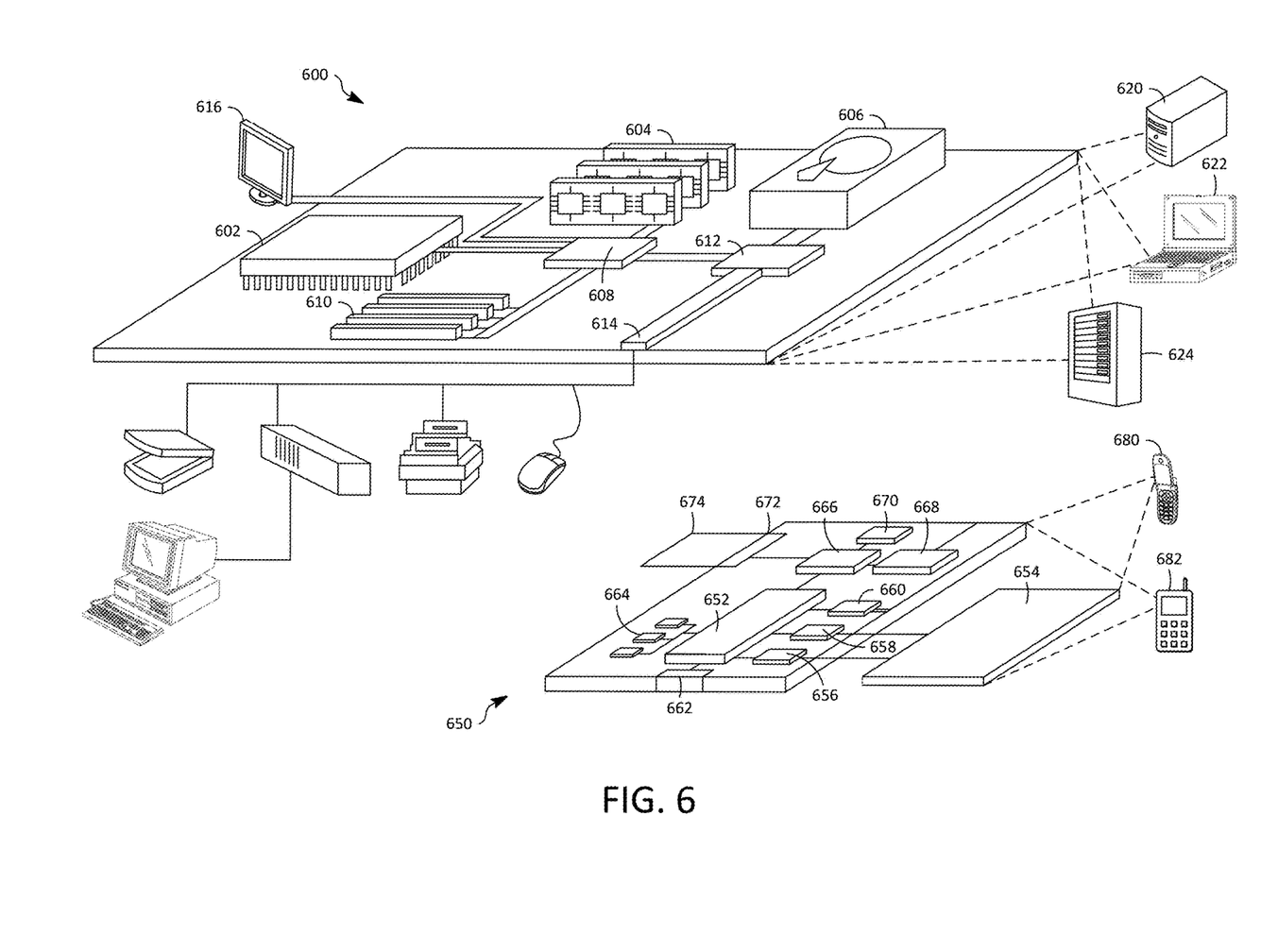
FIG. 6 illustrates an example of a computer device and a mobile computer device that can be used to implement the techniques described herein.

FIG. 6 illustrates an example of a computer device and a mobile computer device that can be used to implement the techniques described herein. an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing partitions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Partitions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method for encoding video data, the method comprising:
    partitioning a block of video data into a first partition and a second partition, the first partition and the second partition being divided by a border that is a smooth line having a sinusoidal shape with at least one inflection;
    determining a first motion vector for the first partition and a second motion vector for the second partition;
    repartitioning the block into an updated first partition based on the first motion vector and an updated second partition based on the second motion vector;
    determining a first set of predictor values based on the first motion vector and a second set of predictor values based on the second motion vector;
    combining the first set of predictor values and the second set of predictor values into an overall set of predictor values based on a weighting algorithm associated with the updated first partition and the updated second partition;
    transforming the first motion vector and the second motion vector and the overall set of predictor values, the first motion vector and the second motion vector being motion vectors for the block of video data;
    quantizing the transformed motion vectors and the transformed overall set of predictor values; and
    entropy encoding the quantized motion vectors and the quantized overall set of predictor values.

2. The method of claim 1, wherein the set of predictor values are residual errors associated with the motion vectors.

3. The method of claim 1, wherein the block of video data is a macroblock based on a standard definition.

4. The method of claim 1, wherein
    combining the first set of predictor values and the second set of predictor values into an overall set of predictor values includes:
        determining a weight function for a pixel index of the block of video data,
        scaling a first predictor value associated with the pixel index from the first set of predictor values based on the weight function,
        scaling a second predictor value associated with the pixel index from the second set of predictor values based on the weight function, and
        generating an overall predictor value associated with the pixel index based on the scaled first predictor value and the scaled second predictor value.

5. The method of claim 1, wherein combining the first set of predictor values and the second set of predictor values into an overall set of predictor values is based on a polynomial equation.

6. The method of claim 1, wherein combining the first set of predictor values and the second set of predictor values into an overall set of predictor values includes:
    determining a mask codebook associated with the block of video data;
    determining a polynomial equation including variables associated with the polynomial equation and the mask codebook;
    determining a smoothing function used to smooth a calculated result of the polynomial equation;
    determining a weight function associated with the mask codebook, the weight function having smoothed a result of the polynomial equation as an input; and
    combining the first set of predictor values and the second set of predictor values based on the weight function.

7. The method of claim 1, wherein combining the first set of predictor values and the second set of predictor values into an overall set of predictor values is based on a non-linear polynomial equation.

8. The method of claim 1, wherein combining the first set of predictor values and the second set of predictor values into an overall set of predictor values includes:
    determining a mask codebook associated with the block of video data;
    determining a non-linear polynomial equation including variables associated with the non-linear polynomial equation and the mask codebook;
    determining a smoothing function used to smooth a calculated result of the non-linear polynomial equation;
    determining a weight function associated with the mask codebook, the weight function having smoothed a result of the non-linear polynomial equation as an input; and
    combining the first set of predictor values and the second set of predictor values based on the weight function.

9. The method of claim 1, wherein combining the first set of predictor values and the second set of predictor values into an overall set of predictor values includes reading a weight function including a weighted mask for a pixel index of the block of video data from a mask codebook stored in a memory.

10. A video coding system, comprising:
    an encoder configured to:
        partition a block of video data into a first partition and a second partition, the first partition and the second partition being divided by a border that is a smooth line having a sinusoidal shape with at least one inflection;
        determine a first motion vector for the first partition and a second motion vector for the second partition;
        repartition the block into an updated first partition based on the determined first motion vector and an updated second partition based on the determined second motion vector;
        determine an updated motion vector for the updated first partition and an updated second motion vector for the updated second partition;
        determine a first set of predictor values for the block based on the updated first motion vector and a second set of predictor values for the block based on the updated second motion vector; and
        combine the first set of predictor values and the second set of predictor values into an overall set of predictor values based on a weighting algorithm associated with the updated first partition and the updated second partition;
        transform the updated first motion vector and the updated second motion vector and the overall set of predictor values, the updated first motion vector and the updated second motion vector being motion vectors for the block of video data, and
    a quantizer configured to:

quantize the transformed motion vectors and the transformed overall set of predictor values; and an entropy coder configured to entropy encode the quantized motion vectors and the quantized overall set of predictor values.

11. The video coding system of claim 10, wherein the set of predictor values are residual errors associated with the motion vectors.

12. The video coding system of claim 10, wherein the encoder combines the first set of predictor values and the second set of predictor values into an overall set of predictor values includes:

determining a weight function for a pixel index of the block of video data, scaling a first predictor value associated with the pixel index from the first set of predictor values based on the weight function, scaling a second predictor value associated with the pixel index from the second set of predictor values based on the weight function, and generating an overall predictor value associated with the pixel index based on the scaled first predictor value and the scaled second predictor value.

13. The video coding system of claim 10, wherein the encoder combines the first set of predictor values and the second set of predictor values into an overall set of predictor values based on a polynomial equation.

14. The video coding system of claim 10, wherein the encoder combines the first set of predictor values and the second set of predictor values into an overall set of predictor values includes:

determining a mask codebook associated with the block of video data;

determining a non-linear polynomial equation including variables associated with the non-linear polynomial equation and the mask codebook;

determining a smoothing function used to smooth a calculated result of the non-linear polynomial equation;

determining a weight function associated with the mask codebook, the weight function having smoothed a result of the non-linear polynomial equation as an input; and combining the first set of predictor values and the second set of predictor values based on the weight function.

15. The video coding system of claim 10, wherein the encoder combines the first set of predictor values and the second set of predictor values into an overall set of predictor values is based on a non-linear polynomial equation.

16. The video coding system of claim 10, wherein the encoder combines the first set of predictor values and the second set of predictor values into an overall set of predictor values includes:

determining a mask codebook associated with the block of video data;

determining a non-linear polynomial equation including variables associated with the non-linear polynomial equation and the mask codebook;

determining a smoothing function used to smooth a calculated result of the non-linear polynomial equation;

determining a weight function associated with the mask codebook, the weight function having smoothed a result of the non-linear polynomial equation as an input; and combining the first set of predictor values and the second set of predictor values based on the weight function.

17. The video coding system of claim 10, wherein the encoder combines the first set of predictor values and the second set of predictor values into an overall set of predictor values includes reading a weight function including a weighted mask for a pixel index of the block of video data from a mask codebook stored in a memory.

18. A method for encoding video data, the method comprising:

partitioning a block of pixels of video data into a first block partition and a second block partition based on a border that is a smooth line having a sinusoidal shape with at least one inflection;

determining a first motion vector for the first block partition and a second motion vector for the second block partition;

repartitioning the block into an updated first block partition based on the determined first motion vector and updated second block partition based on the determined second motion vector, the updated first block partition being separated from the updated second block partition by an updated border;

determining a first set of predictor values for the pixels of the block based on the first motion vector and a second set of predictor values for the pixels of the block based on the second motion vector;

determining weighting values for the pixels of the block based on distance from each of the pixels to the updated border;

combining the first set of predictor values and the second set of predictor values into an overall set of predictor values for the pixels of the block based on the weighting values for the pixels;

transforming the first motion vector and the second motion vector, as motion vectors for the block of video data, and the overall set of predictor values;

quantizing the transformed motion vectors and the transformed overall set of predictor values; and entropy encoding the quantized motion vectors and the quantized overall set of predictor values.

19. The method of claim 1, wherein repartitioning the block comprises selecting an updated border from a codebook of borders to optimize rate-distortion efficiency.

* * * * *

UNITED STATES PATENT AND TRADEMARK OFFICE
CERTIFICATE OF CORRECTION

| | |
|---|---|
| PATENT NO. | : 9,986,236 B1 |
| APPLICATION NO. | : 14/084252 |
| DATED | : May 29, 2018 |
| INVENTOR(S) | : Mukherjee et al. |

It is certified that error appears in the above-identified patent and that said Letters Patent is hereby corrected as shown below:

On the Title Page

Column 2, item (56), under "OTHER PUBLICATIONS", Lines 1-3, delete "Wang et al., "Complexity Reduction and Performance Improvement for Geometry Partitioning in Video Coding". IEEE vol. 23, No. 2, Feb. 2013.*".

On Page 2, Column 1, item (56), under "OTHER PUBLICATIONS", Lines 1-2, delete "Zhang et al., "Motion Compensation using Polyline based Block Partition". IEEE Xplore 2009.*".

In the Claims

In Column 20, Line 29, Claim 18, delete "updated" and insert -- an updated --, therefor.

Signed and Sealed this
Eighth Day of January, 2019

Andrei Iancu
*Director of the United States Patent and Trademark Office*